Figure 1:
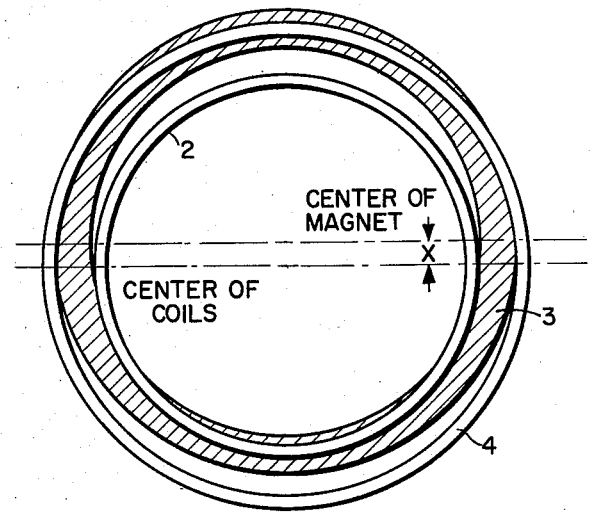

Sept. 1, 1959  W. W. SCHRIEVER  2,902,667
VERTICAL VELOCITY DYNAMIC GEOPHONE

Filed Oct. 21, 1954  2 Sheets-Sheet 1

WILLIAM W. SCHRIEVER *INVENTOR.*

BY
W. N. Wright *ATTORNEY*

WILLIAM W. SCHRIEVER INVENTOR.

United States Patent Office 2,902,667
Patented Sept. 1, 1959

2,902,667

VERTICAL VELOCITY DYNAMIC GEOPHONE

William W. Schriever, Chestnut Hill, Mass., assignor, by mesne assignments, to Jersey Production Research Company Application October 21, 1954, Serial No. 463,749

8 Claims. (Cl. 340—17)

This invention is concerned with a novel form of geophone of the vertical velocity dynamic type. The geophone of this invention employs a circular coil element supported for elastic movement in a vertical plane. A magnetic field perpendicular to the plane of the coil is maintained and concentrated about the coil. Vertical motion of the coil in this magnetic field serves to provide detectable voltages in a manner relatively insensitive to any horizontal movement imparted to the geophone. These basic features of the geophone of this invention permit inclusion of many desirable features in the geophone including lack of sensitivity to the orientation of the geophone about its axis, possibility for construction of the geophone with a central opening for accommodation of the geophone cable, and provision for symmetrical damping of the suspended coil. It is a particular feature of this invention to conserve the magnetic field in this arrangement by employing a plurality of annular air gaps and a plurality of coil sections providing a geophone of improved sensitivity.

A method commonly employed for prospecting for oil or for other mineral deposits is that known as seismic prospecting wherein the depth and probable nature of underlying substrata are ascertained by initiating a seismic shock at a selected point at or near the earth's surface, the resulting motion of the earth from seismic waves initiated by the seismic disturbance being detected at a number of points at the earth's surface by means of sensitive pickups, known as geophones or seismometers, which translate the detected wave motion into electrical impulses which after suitable amplification can be recorded on a seismograph. Usually the seismic disturbance is produced by detonation of an explosive shot placed on the ground, in a shot hole, or above the surface of the ground and adjacent thereto. It is common practice to place the geophones in line with the shot point and to space them more or less evenly from each other and from the shot point. A suitable multiconductor cable is provided through which the individual geophones can be connected to a recording station, usually a field truck, provided with seismograph instruments. Conventionally, a seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

The making of seismograph records in the manner above referred to is of value in that it gives information regarding the nature of the earth's subsurface, based on the principle that part of the energy of the artificial seismic shock will travel downwardly and be reflected back toward the surface by various more or less well-defined substrata, and that this reflected energy will be detected by the geophones and will be recorded on the seismograph record. Hence, the desirability of placing on one record the traces of as many geophone locations as is practical, since a reflection from a well-defined substratum will appear on the record as a wave form of increased amplitude on all of the traces in some definite time relation, permitting the reflection to be "lined up" on the record.

In order to increase the effectiveness of such records, it has become frequent practice to employ a plurality of geophones at each station, all tied to one trace on the record. This practice has many advantages, including the cancelling out of near-surface anomalies. For example, if only a single geophone is used and it happens to be placed near a buried stump or boulder, an anomalous travel time may be obtained for seismic waves reaching that geophone, whereas if 30 or 50 geophones are laid out and all tied to the same trace, anomalous signals will be cancelled out and the reflected wave will be picked up by the majority of the geophones. Also, if a plurality of geophones are laid out in the direction of the line of spread of the geophone stations and several geophones are tied to the same trace, the group of geophones will act as a directional receiver since signals that are not lined up will tend to cancel out, whereas nearly plane wave fronts, representing reflections from substrata, will arrive at all of the geophones at substantially the same time. Furthermore, a plurality of geophones tied together in this manner aid in discriminating against disturbing background noise, generally referred to as "wind noise" and "ground unrest"; thus resulting in improved presentation of the reflected signal. A further result will be that weaker reflected signals will be discernible, or conversely, smaller initiating explosive charges may be employed to give equal efficiency in detecting reflecting layers.

The geophone of this invention is adapted to provide many of the requisites indicated in the preceding discussion. Assemblies of the geophone to be described may be readily placed on a geophone cable in a manner permitting unreeling of the cable on the surface of the earth to eliminate hand planting and to provide readily the advantages of extending a large number of geophones along the surface of the earth. This geophone array is directionally sensitive to true vertical reflected seismic waves and by the nature of each individual geophone and an array of such geophones serves to cancel horizontal earth vibrations or spurious signals of other types.

The attached drawings provide a basis for a complete understanding of the principles embodied in the geophone of this invention and preferred geophone assemblies for the practice of the invention.

Figure 2:
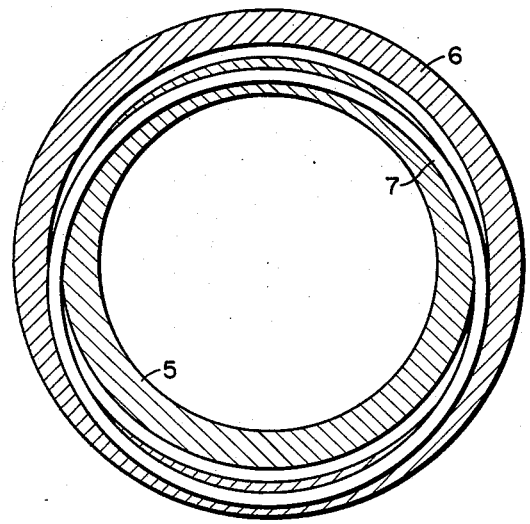
Figure 3:
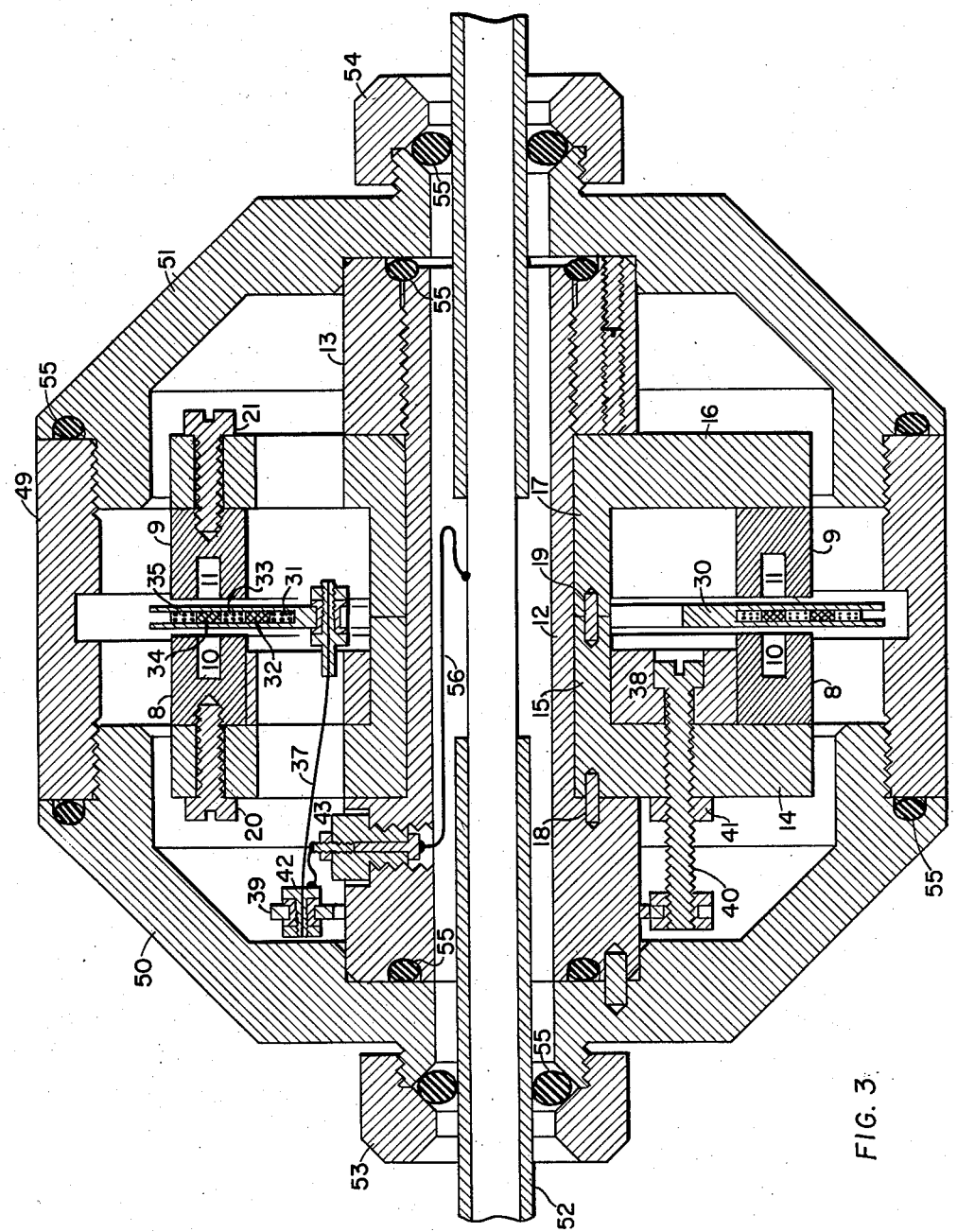

In the drawings:

Figure 1 diagrammatically illustrates the basic principles employed in this invention with reference to two coils and a ring-shaped magnetic field about the coils;

Figure 2 similarly illustrates the principles of this invention with reference to a single coil and two ring-shaped magnetic fields about the coils; and Figure 3 is a cross-sectional elevational view of a preferred geophone embodying the principles of this invention.

Referring first to Figure 1, the novel principles employed in the geophone of this invention can be appreciated. In Figure 1 the numeral 2 designates a ring-shaped conductor intended to represent the detecting coil of the geophone to be described. It is assumed that a magnetic field indicated by the shaded area 3 extends in the vicinity of the coil 2 so as to be perpendicular to the plane of the coil. It is assumed that this magnetic field exists only in the shaded area and that the coil is supported on a symmetrical suspension permitting vertical elastic movement of the coil but tending to bring the center of the coil toward the center of the magnetic field. It is apparent that in this arrangement, the force of gravity acting on the suspended coil will displace the coil downwardly a distance indicated on the drawing by "x." Small vertical motions of the coil will cause induction of an electromotive force in the coil proportional to the length of a common chord of the circles representing the coil and the inside of the magnetic field. The magnitude of the electromotive force induced will be a theoretical maximum when the diameter of the coil is substantially the inner diameter of the magnetic field (as illustrated). In this arrangement, horizontal motions of the coil produce virtually no induced electromotive force since the distance between the center of the coil and the center of the magnetic field is virtually unaffected. Again, rotation of the arrangement about its axis will result in the same configuration so that this arrangement is independent of rotational orientation.

In considering the basic principles illustrated in Figure 1, it may be noted that if a second coil indicated by numeral 4 is similarly positioned, but in which the coil has a diameter corresponding to the outside diameter of the magnetic field, then an induced electromotive force of opposite polarity will be developed. By connecting the two coils in alternate polarity, it is thus possible to develop twice the signal, thereby conserving the magnetic field.

The geophone of this invention is intended to utilize the basic principles indicated in connection with Figure 1. The basic principle of this invention is to provide a geophone having the general arrangement described and employing a plurality of magnetic fields and/or a plurality of coils. The invention entails use of a number of coils one greater or less than the number of magnetic fields. In one form of the invention, for example, means are employed to provide a magnetic field which will be concentrated in a shaded area, of the nature indicated in Figure 1, as sharply as possible. A first coil is employed having a mean diameter substantially that of the inside diameter of the magnetic field. A second coil is also employed, having a mean diameter substantially that of the outside diameter of the magnetic field. As will become apparent, the use of a plurality of coils in this manner is particularly advantageous in providing increased sensitivity.

Again, for example, the invention may be embodied in the arrangement diagrammatically illustrated in Figure 2. In this arrangement, two magnet fields, 5 and 6, are concentrated in areas of different diameter and these fields are of alternate polarity. A single coil 7 is suspended in these fields, the coil 7 having approximately the mean diameter of the two magnetic fields. In this arrangement, the coil 7 will develop twice the signal of either coil illustrated in Figure 1.

In the preferred geophone of this invention, the principles described are embodied by using two circular channel magnets of different diameter to provide two annular gaps having magnetic fields of opposite polarity. Three coils are arranged in the two air gaps so that one coil has a mean diameter less than the diameter of the smaller circular magnet, another coil has a mean diameter greater than the diameter of the larger circular magnet, and the third coil has a mean diameter equal to the average diameter of the two magnets. By connecting these three coils in series opposition, a geophone having four times the sensitivity of one coil in a single magnetic field is obtained. This arrangement is particularly advantageous in providing a light and economical design, since the flux of one annular gap returns through the other.

Referring now to Figure 3, the practical construction for this preferred form of the geophone of this invention is illustrated. This figure illustrates a cross-sectional elevational view of the geophone, all parts in section being symmetrical about the axis of the geophone and thus being circular in configuration. In Figure 3, the numerals 8 and 9 identify a pair of ring-shaped magnets which may constitute strong permanent magnets constructed of an alloy such as Alnico. Circular slots identified by numerals 10 and 11 are cut in each of the two ring magnets 8 and 9. As illustrated, the two ring magnets are clamped in opposed spaced relationship so as to provide two annular air gaps between the extensive portions of the magnets. In order to suitably position the magnets in place, an inner mandrel element 12 may be employed. Mandrel element 12 terminates at the left side thereof in a head portion of enlarged diameter, and the opposite end is threaded to receive the retaining ring 13. Bearing against the head of the mandrel element 12, is a first disc 14 integral with a cylindrical element 15 adjacent which is positioned a second disc element 16 integral with a cylindrical element 17. Elements 14, 15, 16 and 17 are clamped in fixed position by the threaded retaining ring 13. Keys 18 and 19 may be provided in order to accurately fix the position of these elements. The ring-shaped magnets 8 and 9 are clamped between the discs 14 and 16 and are held in position by suitable set screws 20 and 21 arranged around the periphery of the disc elements 14 and 16.

The remaining essentials of the geophone illustrated constitute the coils to be employed together with suitable means to support these coils and to provide electrical connection to the coils. The coil form is designated by numeral 30 and includes a pair of spaced radially extensive disc-shaped elements within which the coils may be wound and positioned. As shown, three coils are wound on the coil form 30. An innermost coil 31 is provided having a diameter somewhat less than the minimum diameter of the ring shaped magnets. Insulating material 32 is wrapped about the innermost coil 31 and a second coil 33 is then provided. Coil 33 is arranged to have a diameter substantially that of the slots 10 and 11 cut in the ring-shaped magnets. Insulating material 34 is then wrapped around the second coil 33 and a final coil 35 is then provided on the coil form. Coil 35 has a diameter which is somewhat greater than the maximum diameter of the ring-shaped magnets.

In order to hold the coil form and coils in the proper position with respect to the magnets, three spring elements 37 (one of which is illustrated) are fixed to the coil form 30. These spring elements 37 extend outwardly through suitable clearance openings in the disc member 38 so as to be fixed in and held by an insulating ring 39. Insulating ring 39 is held in suitable position by means of the adjustment screws 40 which pass through the insulating ring and thread into the disc shaped member 38 which is clamped against disc member 14 by means of nuts 41. By employing three adjustment screws 40, it is possible to conveniently fix the position of the coil form directly in the air gap as desired. It will be observed that by spacing the three spring supports 37 at equal annular intervals about the axis of the apparatus, symmetrical coil suspension is obtained in a manner insensitive to the rotational position of the assembly. Again it will be observed that this spring suspension system serves to suitably protect the elements of the apparatus against jar caused by inadvertent shock of the geophone due to forces applied along the axis of the geophone. In addition, this suspension system protects the elements against deformation or injury caused by shocks normal to the axis of the geophone. The clearance openings for the springs provided in disc 38 act as limit stops to prevent movement of the coil form beyond the elastic limits of the springs.

Electrical connection to the coils of the apparatus may be made by connecting terminals 42 to two of the spring supports 37. Terminals 42 are in turn connected to two terminals 43 in the head of the mandrel element 12. A suitable housing is provided for this arrangement by employing a cylindrical element 49 adapted to encircle the inner portion of the apparatus. At opposite ends of the ring shaped element 49 are two closure elements 50 and 51, each of which is in threaded relationship with the cylindrical member 49. Cap members 53 and 54, provided with central clearance openings for a geophone cable 52, are threaded to the ends of closure members 50 and 51. O-ring seals identified by numeral 55 are positioned as shown between portions of the apparatus so that when each of the portions are placed in tightly threaded relationship with each other, the O-ring seals completely seal the different elements of the apparatus and the geophone cable 52 within the apparatus. Thereby, it is possible to place oil as a bath within the geophone housing and about the magnets.

Electrical connection to the geophone cable 52 is accomplished by removing cap members 53 and 54 and pulling conductor 56, connected to each of the two terminals 43, outside the geophone casing. The conductors 56 may then be spliced to conductors of the geophone cable, and the splice may then be pulled into the geophone casing as illustrated. By tightening the cap members 53 and 54, the geophone is tightly fixed to the cable in a manner protecting the spliced portion of the cable.

In this arrangement the three coils described are to be connected in series opposition. In this arrangement, due to the critical size of the three coils with respect to the two annular air gaps provided, movement of the coils vertically in the air gap will cause generation of an output voltage in the geophone coils of a nature providing a maximum signal. Thus, as one of the three coils is moved into a position of maximum flux strength in one direction between one of the air gaps, another of the three coils will be moving into a field of minimum strength in the other air gap in a manner to provide a cumulative output signal. The geophone design described has a number of other advantages. It will be observed, for example, that the coil form 30 extends laterally across the magnetic field provided between the two ring magnets 8 and 9. This construction permits the development of eddy currents in the coil form which serve to provide desirable damping of the suspended coil.

The coil elements in the geophone described are arranged in order to employ the principle described in connection with Figure 1 resulting in the induction of voltages of opposite polarity in the different coils. Essentially this is achieved by employing a number of coils one greater than the number of annular air gaps provided in the apparatus. While this principle can be used with a single annular air gap by employing two coils, as shown in Figure 2, the use of three coils provides a novel and substantial advantage since the sensitivity of the central coil in this arrangement results in the central coil having twice the sensitivity of either of the other two windings as an inherent result of the magnetic field arrangement.

The arrangement described is also advantageous in providing a form of geophone in which a central opening may be maintained to accommodate the geophone cable. The arrangement of geophones in this manner on the geophone cable makes it possible to handle the geophones by means of a reel or so-called "cable squirter." The need for hand planting of each geophone is eliminated. As will be appreciated by those skilled in the art, the geometry of the geophone described will be adjusted to provide a resonant system falling in the seismic frequency range. A seven-cycle resonant geophone, for example, would have a coil diameter of about 6 inches. Geophones having higher resonant frequencies would have a substantially smaller radial diameter.

What is claimed is:

1. A geophone comprising in combination: means to provide at least two concentric magnetic fields of alternate polarity each concentrated in an annular area and parallel to a common horizontal reference axis about which they have substantially a symmetry of revolution, a coil with at least two concentric sections, one of said sections having a diameter somewhat greater than that of the larger of a pair of the said magnetic fields and the other section having a diameter somewhat less than that of the smaller of the said pair of magnetic fields, suspension means to elastically support the said coil in the said magnetic field in a manner positioning the axis of the coil essentially horizontal and generally coincident with said reference axis, said suspension means providing essentially vertical motion of said coil in said field, and conductor means connected to the said coil.

2. The geophone defined by claim 1 in which said means to provide the concentric magnetic fields comprises a pair of substantially ring-shaped channel magnets of opposite polarity spaced along the said axis.

3. The geophone defined by claim 1 in which the said coil is wound on an electrically conductive form extending substantially through the said concentric magnetic fields which is adapted to provide eddy currents for substantially symmetrical damping of the mechanical system of the said coil and the said suspension means.

4. The geophone defined by claim 1 in which the mechanical system of the said coil and the said suspension means is damped with a viscous fluid.

5. A geophone comprising in combination: means to provide two concentric magnetic fields in annular areas of different diameter having substantial symmetry about a horizontal reference axis, three concentric coil elements respectively having diameters less than, greater than, and equal to the mean diameter of the magnetic fields, and suspension means to elastically support the coil elements in the said annular magnetic fields in a manner positioning the axis of the coils essentially horizontal and generally coincident with said reference axis, said suspension means providing essentially vertical motion of said coils in said field, and conductor means connected to said coil elements.

6. The geophone defined by claim 5 in which the said concentric magnetic fields are provided by a pair of opposed ring-shaped magnets having cut-away circular slot portions in the adjacent faces.

7. A geophone comprising in combination: a horizontally arranged tubular mandrel having a central bore to receive a cable passing therethrough, a pair of substantially ring-shaped magnets of opposite polarity supported by said mandrel in spaced relation coaxially thereof in a manner defining an annular gap positioned in a vertical plane essentially perpendicular to the axis of said mandrel, a coil element having at least two concentric sections, one of said sections having a mean diameter somewhat less than, and the other of said sections having a mean diameter somewhat greater than the mean diameter of the annular magnetic field set up by said magnets, means elastically suspending said coil element in said annular gap with the axis of the coil essentially horizontal, said suspending means providing essentially vertical motion of said coil in said gap, and conducting means connected to the said coil element.

8. A geophone as defined by claim 7 wherein a circular groove is cut into the face of each of said magnets adjacent said gap whereby to provide two concentric magnetic fields in said gap, and wherein said coil element has three concentric sections, one of said sections having a mean diameter less than, a second section having a mean diameter greater than, and a third section having a mean diameter equal to the mean diameter of the magnetic fields, said conductor means connecting said coil sections in series opposition.

References Cited in the file of this patent

UNITED STATES PATENTS

| | | |
|---|---|---|
| 1,951,358 | Hayes | Mar. 20, 1934 |
| 2,269,453 | Gayhart | Jan. 13, 1942 |
| 2,271,864 | Honnell et al. | Feb. 3, 1942 |
| 2,325,199 | Woods | July 27, 1943 |
| 2,438,231 | Schultz | Mar. 31, 1948 |
| 2,601,543 | McLoad | June 24, 1952 |
| 2,659,065 | Cordell | Nov. 10, 1953 |
| 2,781,502 | Richards | Feb. 12, 1957 |